(12) United States Patent
Aulanko et al.

(10) Patent No.: US 9,315,938 B2
(45) Date of Patent: *Apr. 19, 2016

(54) ELEVATOR WITH HOISTING AND GOVERNOR ROPES

(75) Inventors: Esko Aulanko, Kerava (FI); Jorma Mustalahti, Hyvinkaa (FI); Pekka Rantanen, Hyvinkaa (FI); Simo Makimattila, Espoo (FI)

(73) Assignee: KONE CORPORATION, Helsinki (FI)

( * ) Notice: Subject to any disclaimer, the term of this patent is extended or adjusted under 35 U.S.C. 154(b) by 1232 days.

This patent is subject to a terminal disclaimer.

(21) Appl. No.: 10/452,311

(22) Filed: Jun. 3, 2003

(65) Prior Publication Data

US 2004/0016603 A1 Jan. 29, 2004

Related U.S. Application Data

(63) Continuation of application No. PCT/FI02/00500, filed on Jun. 7, 2002.

(30) Foreign Application Priority Data

Jun. 21, 2001 (FI) .................................... 20011339

(51) Int. Cl.
*B66B 11/08* (2006.01)
*B66B 7/06* (2006.01)
(Continued)

(52) U.S. Cl.
CPC .............. *D07B 1/0673* (2013.01); *B66B 7/06* (2013.01); *B66B 11/00* (2013.01); *B66B 11/08* (2013.01);
(Continued)

(58) Field of Classification Search
CPC ............ D07B 1/06; D07B 1/16; D07B 1/162; D07B 1/163; B66B 11/08; B66B 11/008; B66B 15/08
USPC ............ 187/254, 263, 266, 251, 250; 57/231, 57/232, 250, 251, 258
See application file for complete search history.

(56) References Cited

U.S. PATENT DOCUMENTS

| 1,625,084 A | 4/1927 | Hymans |
| 2,779,149 A | 1/1957 | Schuller |

(Continued)

FOREIGN PATENT DOCUMENTS

| DE | 1 032 496 | 6/1958 |
| DE | 1032496 | 6/1958 |

(Continued)

OTHER PUBLICATIONS

Lubomir Javonsky, Elevator Mechanical Design Principles and Concepts, 1987, Ellis Horwood Limited, p. 120.*

(Continued)

*Primary Examiner* — Michael Mansen
*Assistant Examiner* — Stefan Kruer
(74) *Attorney, Agent, or Firm* — Harness, Dickey & Pierce, PLC

(57) ABSTRACT

An elevator may include: a hoisting machine; hoisting ropes; a traction sheave that includes grooves; and diverting pulleys. Each of the hoisting ropes may individually contact one of the grooves. Each hoisting rope may include steel wires of circular, non-circular, or circular and non-circular cross-section, twisted together to form strands. The strands of each hoisting rope may be twisted together to form the hoisting rope. A thickness of each of the hoisting ropes may be greater than or equal to 2.5 mm and less than or equal to 8 mm. A cross-sectional area of the steel wires of the hoisting ropes may be greater than 0.015 mm² and less than 0.2 mm². The strength of the steel wires may be greater than 2,700 N/mm² and less than 3,000 N/mm².

22 Claims, 9 Drawing Sheets

(51) Int. Cl.
*D07B 1/16* (2006.01)
*F16G 9/00* (2006.01)
*B66B 15/08* (2006.01)
*B66B 11/00* (2006.01)
*D07B 1/06* (2006.01)

(52) U.S. Cl.
CPC . *D07B 1/16* (2013.01); *D07B 1/165* (2013.01); *D07B 2201/1036* (2013.01); *D07B 2501/2007* (2013.01); *F16G 9/00* (2013.01)

(56) References Cited

U.S. PATENT DOCUMENTS

| | | | |
|---|---|---|---|
| 3,141,386 A | 7/1964 | Loughridge | |
| 3,279,762 A | 10/1966 | Bruns | |
| 3,559,768 A | 2/1971 | Cox | |
| 3,645,519 A | 2/1972 | Schwarz et al. | |
| 3,822,542 A * | 7/1974 | Naud et al. | 57/215 |
| 4,022,010 A * | 5/1977 | Gladenbeck et al. | 57/231 |
| 4,022,080 A | 5/1977 | Bachmann | |
| 4,065,161 A | 12/1977 | MacMaster | |
| 4,102,118 A | 7/1978 | Wheeler | |
| 4,258,543 A * | 3/1981 | Canevari | B60C 9/0007 152/451 |
| 4,434,850 A | 3/1984 | McCoy | |
| 4,434,873 A | 3/1984 | Ohta et al. | |
| 4,465,161 A | 8/1984 | Ohta et al. | |
| 4,481,996 A * | 11/1984 | De Bondt et al. | 152/451 |
| 4,555,091 A | 11/1985 | May et al. | |
| 4,566,562 A | 1/1986 | Suzuki et al. | |
| 4,591,025 A | 5/1986 | Honda | |
| 4,606,183 A * | 8/1986 | Riggs | 57/221 |
| 4,624,097 A * | 11/1986 | Wilcox | 57/232 |
| 4,676,058 A | 6/1987 | Foley et al. | |
| 4,756,388 A | 7/1988 | Heikkinen | |
| 4,807,723 A | 2/1989 | Salmon et al. | |
| 4,827,708 A * | 5/1989 | Verreet | 57/212 |
| 4,895,223 A | 1/1990 | Ekholm et al. | |
| 4,930,603 A | 6/1990 | Brenner | |
| 4,952,249 A | 8/1990 | Dambre | |
| 5,025,893 A | 6/1991 | Saito | |
| 5,054,987 A | 10/1991 | Thornton | |
| 5,076,398 A | 12/1991 | Heikkinen | |
| 5,112,933 A | 5/1992 | O'Donnell et al. | |
| 5,261,974 A | 11/1993 | Hyodo et al. | |
| 5,278,484 A | 1/1994 | Hakala | |
| 5,361,873 A | 11/1994 | de Jong et al. | |
| 5,370,205 A * | 12/1994 | Vanhala | 187/264 |
| 5,377,786 A * | 1/1995 | Nakagawa | 187/287 |
| 5,429,211 A * | 7/1995 | Aulanko et al. | 187/254 |
| 5,461,850 A | 10/1995 | Bruyneel et al. | |
| 5,490,577 A * | 2/1996 | Yoo | 187/252 |
| 5,533,595 A | 7/1996 | Narumi et al. | |
| 5,566,786 A | 10/1996 | De Angelis et al. | |
| 5,573,084 A | 11/1996 | Hakala | |
| 5,823,298 A | 10/1998 | Aulanko et al. | |
| 5,839,264 A | 11/1998 | Uchio | |
| 5,869,795 A | 2/1999 | Miyazawa et al. | |
| 5,894,910 A | 4/1999 | Suur-Askola et al. | |
| 5,896,948 A | 4/1999 | Suur-Askola et al. | |
| 5,899,300 A * | 5/1999 | Miller et al. | 187/256 |
| 5,899,301 A | 5/1999 | Aulanko et al. | |
| 5,921,351 A | 7/1999 | Schröder-Brumloop | |
| 5,929,400 A | 7/1999 | Colby et al. | |
| 5,957,242 A | 9/1999 | Suter et al. | |
| 5,984,052 A | 11/1999 | Cloux et al. | |
| 6,035,974 A | 3/2000 | Richter et al. | |
| 6,182,433 B1 * | 2/2001 | Tagawa | 57/212 |
| 6,193,016 B1 | 2/2001 | Hollowell et al. | |
| 6,193,017 B1 * | 2/2001 | Koster | 187/258 |
| 6,199,666 B1 * | 3/2001 | Aulanko et al. | 187/277 |
| 6,276,120 B1 * | 8/2001 | Adriaensen et al. | 57/210 |
| 6,295,799 B1 * | 10/2001 | Baranda | 57/221 |
| 6,325,179 B1 | 12/2001 | Barreiro et al. | |
| 6,334,293 B1 * | 1/2002 | Poethke et al. | 57/210 |
| 6,345,695 B1 | 2/2002 | Fargo et al. | |
| 6,364,061 B2 | 4/2002 | Baranda et al. | |
| 6,367,587 B2 * | 4/2002 | Hakala et al. | 187/256 |
| 6,397,974 B1 * | 6/2002 | Adifon et al. | 187/254 |
| 6,401,871 B2 * | 6/2002 | Baranda et al. | 187/254 |
| 6,412,264 B1 * | 7/2002 | De Josez et al. | 57/217 |
| 6,440,579 B1 * | 8/2002 | Hauser et al. | 428/607 |
| 6,443,266 B2 * | 9/2002 | Murakami et al. | 187/401 |
| 6,488,124 B1 | 12/2002 | Yasuda et al. | |
| 6,513,792 B1 | 2/2003 | De Angelis | |
| 6,566,562 B2 | 5/2003 | Wöhrle et al. | |
| 6,601,828 B2 * | 8/2003 | Strbuncelj et al. | 254/266 |
| 6,631,789 B1 * | 10/2003 | de Jong et al. | 187/349 |
| 6,631,790 B2 | 10/2003 | Mattlar et al. | |
| 6,667,110 B1 * | 12/2003 | Cordonnier et al. | 428/544 |
| 6,739,433 B1 | 5/2004 | Baranda et al. | |
| 7,207,421 B2 | 4/2007 | Aulanko et al. | |
| 7,222,698 B2 | 5/2007 | Hänninen | |
| 7,225,901 B2 | 6/2007 | Mustalahti et al. | |
| 8,020,669 B2 | 9/2011 | Aulanko et al. | |
| 8,069,955 B2 | 12/2011 | Aulanko et al. | |
| 8,556,041 B2 | 10/2013 | Mustalahti et al. | |
| 2001/0045329 A1 | 11/2001 | Swaybill | |
| 2002/0000346 A1 | 1/2002 | Baranda et al. | |
| 2002/0023803 A1 | 2/2002 | Vaisanen | |
| 2002/0056593 A1 | 5/2002 | Adifon et al. | |
| 2002/0125079 A1 | 9/2002 | Mattlar et al. | |
| 2003/0089551 A1 * | 5/2003 | Kato et al. | 182/1 |
| 2003/0159891 A1 | 8/2003 | Ach et al. | |
| 2004/0016602 A1 | 1/2004 | Aulanko et al. | |
| 2004/0016603 A1 * | 1/2004 | Aulanko et al. | 187/254 |
| 2004/0035645 A1 | 2/2004 | Orrmann | |
| 2004/0065513 A1 | 4/2004 | Aulanko et al. | |
| 2004/0089502 A1 | 5/2004 | Martini | |
| 2004/0129501 A1 | 7/2004 | Wittur et al. | |
| 2004/0154871 A1 | 8/2004 | Allerding et al. | |
| 2005/0006180 A1 | 1/2005 | Mustalahti et al. | |
| 2005/0060979 A1 | 3/2005 | Aulanko et al. | |
| 2005/0126859 A1 * | 6/2005 | Aulanko et al. | 187/264 |
| 2005/0236232 A1 | 10/2005 | Mustalahti et al. | |
| 2005/0284705 A1 | 12/2005 | Aulanko et al. | |
| 2006/0231345 A1 | 10/2006 | Mustalahti et al. | |
| 2007/0000735 A1 | 1/2007 | Hanninen | |
| 2008/0041666 A1 | 2/2008 | Siikonen et al. | |
| 2014/0027211 A1 * | 1/2014 | Wesson | B66B 7/06 187/414 |

FOREIGN PATENT DOCUMENTS

| | | |
|---|---|---|
| DE | 1 033 383 | 7/1958 |
| DE | 1 756 950 A1 | 11/1970 |
| DE | 26 22 745 A1 | 12/1976 |
| DE | 36 34 859 A1 | 12/1987 |
| DE | 38 82 375 T2 | 6/1988 |
| DE | 39 07 541 A1 | 9/1989 |
| DE | 693 15 181 T2 | 4/1998 |
| EP | 0 144 811 B1 | 6/1985 |
| EP | 0 493 807 B1 | 7/1992 |
| EP | 0578237 | 7/1993 |
| EP | 576 802 A1 | 1/1994 |
| EP | 0 602 733 A1 | 6/1994 |
| EP | 0 606 875 A1 | 7/1994 |
| EP | 0631967 | 1/1995 |
| EP | 0631968 | 1/1995 |
| EP | 0 743 276 A2 | 5/1996 |
| EP | 0749930 A2 | 12/1996 |
| EP | 0794919 | 9/1997 |
| EP | 0794920 | 9/1997 |
| EP | 1 028 082 A2 | 8/2000 |
| EP | 1 057 771 A2 | 12/2000 |
| EP | 1213250 | 6/2002 |
| EP | 1250280 | 10/2002 |
| EP | 1 273 695 A1 | 1/2003 |
| EP | 0948453 B1 | 3/2003 |
| EP | 1 327 598 A1 | 7/2003 |
| EP | 1347930 | 10/2003 |
| EP | 1397304 | 3/2004 |
| EP | 1463680 | 10/2004 |
| EP | 1511683 | 3/2005 |

(56) References Cited

FOREIGN PATENT DOCUMENTS

| | | |
|---|---|---|
| EP | 1517850 | 3/2005 |
| EP | 1558514 | 8/2005 |
| EP | 1567441 | 8/2005 |
| EP | 1567442 | 8/2005 |
| EP | 1590289 | 11/2005 |
| EP | 1701904 | 9/2006 |
| EP | 1855977 | 11/2007 |
| ES | 2 155 007 A1 | 4/2001 |
| FI | 4928 U | 5/2001 |
| GB | 1 041 141 | 9/1966 |
| GB | 2 114 528 A | 8/1983 |
| GB | 2 127 934 A | 4/1984 |
| JP | 57-114061 | 7/1982 |
| JP | 57-114061 A | 7/1982 |
| JP | 58-074951 A | 5/1983 |
| JP | 59-4588 | 1/1984 |
| JP | 59-004588 A | 1/1984 |
| JP | 59-164450 A | 9/1984 |
| JP | 60-145170 | 9/1985 |
| JP | 60-145170 A | 9/1985 |
| JP | 03-043196 B2 | 1/1991 |
| JP | 03-043196 B2 | 7/1991 |
| JP | 03-256986 A | 11/1991 |
| JP | 3-256986 A | 11/1991 |
| JP | 05-171580 A | 7/1993 |
| JP | 5-171580 A | 7/1993 |
| JP | 07-010434 | 1/1995 |
| JP | 07-010434 A | 1/1995 |
| JP | 07-010478 A | 1/1995 |
| JP | 07-016729 A | 1/1995 |
| JP | 07-061744 A | 3/1995 |
| JP | 08-061467 A | 3/1996 |
| JP | 8-158275 A | 6/1996 |
| JP | 08-158275 A | 6/1996 |
| JP | 02-593288 B2 | 12/1996 |
| JP | 2593288 | 12/1996 |
| JP | 9-021084 A | 1/1997 |
| JP | 09-021084 A | 1/1997 |
| JP | 09-290983 A | 11/1997 |
| JP | 09-290984 A | 11/1997 |
| JP | 11-157762 A | 6/1999 |
| JP | 2000-095461 A | 4/2000 |
| JP | 2000-153975 A | 6/2000 |
| JP | 2000-153975 A | 6/2000 |
| JP | 2001-26388 | 1/2001 |
| JP | 2001-026388 A | 1/2001 |
| JP | 2001-262482 A | 9/2001 |
| JP | 2002-504469 | 2/2002 |
| JP | 2002-504469 A | 2/2002 |
| JP | 2003-221176 | 8/2003 |
| JP | 2003-221176 A | 8/2003 |
| JP | 2004-520245 A | 7/2004 |
| WO | WO 96/16892 | 6/1996 |
| WO | WO 96/17798 | 6/1996 |
| WO | WO 9711020 A1 * | 3/1997 ............. B66B 11/08 |
| WO | WO 98/16681 | 4/1998 |
| WO | 9943589 | 9/1999 |
| WO | WO 99/43589 | 9/1999 |
| WO | WO 99/43593 A1 | 9/1999 |
| WO | WO 99/43602 A1 | 9/1999 |
| WO | WO 99/43885 | 9/1999 |
| WO | WO 9943885 A1 * | 9/1999 ............. B66B 11/00 |
| WO | WO 00/27739 | 5/2000 |
| WO | WO 00/37738 A1 | 6/2000 |
| WO | WO 01/21522 | 3/2001 |
| WO | WO 01/68973 | 9/2001 |
| WO | WO 0168973 A1 * | 9/2001 ............. D07B 1/16 |
| WO | WO 02/34659 A1 | 5/2002 |
| WO | WO 02/46083 | 6/2002 |
| WO | WO 02/053486 | 7/2002 |
| WO | WO 02/059028 | 8/2002 |
| WO | WO 03/000581 | 1/2003 |
| WO | WO 03/057611 | 7/2003 |
| WO | WO 03/104128 | 12/2003 |
| WO | WO 03/104131 | 12/2003 |
| WO | WO 2004/041699 | 5/2004 |
| WO | WO 2004/041700 | 5/2004 |
| WO | WO 2004/041701 | 5/2004 |
| WO | WO 2004/041704 | 5/2004 |
| WO | WO 2004/067429 | 8/2004 |
| WO | WO 2004/076327 A1 | 9/2004 |
| WO | WO 2005/066057 | 7/2005 |
| WO | WO 2006/095048 | 9/2006 |

OTHER PUBLICATIONS

Feyrer, Klaus "Wires Ropes Tension, Endurance, Reliability", Springer Verlag, Berlin, Heidelberg, 2007, Section 1, pp. 4-7 and 17-26.*
Feyrer, Klaus "Drahtseile Bemessung, Betrieb, Sicherheit", Springer Verlag, Berlin, Heidelberg, 1994, pp. 1-32.*
Weiss, M.P. and Ashkenazy, R., "A Unified Fatigue and Fracture Model applied to Steel Wire Ropes", Technion IIT, Haifa, 2006, pp. 1-8.*
FLS, Inc., Translation Mar. 2014, Feyrer, Wire Rope Elements and Wire Ropes, Heidelberg 2000, Foreword & Translation pp. 8, 13, 16, 40-42, 49, 50, 54, and 58.*
Ralph McElroy Translation Co., Yamamori, JP 0921084 A, Wire Rope Structure, Jan. 21, 1997, pp. 1-17.*
"Tractielift Zonder Machinekamer", Bouwwereld, Misset. , Doetinchem, NL, No. 19, Oct. 11, 1996, pp. 66-68.
English translation of Japanese Patent Office Action dated Nov. 14, 2007, for corresponding Japanese Patent Application No. 2003-506795.
Japanese Patent Office Submission of Publications (filed by an anonymous third party) against Japanese Patent Application No. 2003-557938, dated Jan. 8, 2008.
"Safety rules for the construction and installation of lifts", The European Standard, BS EN 81-1:1998, pp. 1-7.
"Qualified Lift Examiner Training Textbook", Japan Building Equipment and Elevator Center Foundation, 2000, pp. 249, 255, 256, 327 (with partial English translation).
"Lift Glossary", The Japan Elevator Safety Centre Foundation, Oct. 1998, pp. 103, 172 (with partial English translation).
Official Journal of the European Communities, Second Directive, Annex VI, p. 21.
Official Journal of the European Communities, Third Directive, Annex I, pp. 28, 29, 32 and 33.
Official Journal of the European Communities, Fourth Directive, Annex I, pp. 57, 58, and 61.
"Safety rules for the construction and installation of lifts", The European Standard, BS EN 81-1:1998, pp. 1-6, 11, and 55-57.
Otis "Gen2 Class" Brochure, 1999.
Otis, "Gen2 Class" Brochure, 2000.
Translation of Korean Intellectual Property Office ("KIPO") Office Action forwarded on Feb. 25, 2009, for corresponding Korean Patent Application No. 10-003-7007636.
Japanese Office Action (with translation) mailed on Nov. 18, 2008, for corresponding Japanese Patent Application No. 2004-511209.
English translation of Japanese Patent Office Action dated Oct. 20, 2009, for corresponding Japanese Patent Application No. 2003-506795.
"Tractielift zonder machinekamer" BouwWereld Nr. 19, Oct. 11, 1996, pp. 67-68, XP000641873 ISSN 0026-5942, Frank de Groot et al.
Otis Gen2 Class brochure 1999.
Otis Gen2 Class brochure 2000.
"Dubbel", Taschenbuch Maschinenbau, $13^{th}$ Edition Auflage Tatsachen und Begrundung (1974).
"Dubbel", Taschenbuch Maschinenbau $21^{st}$ Edition, Auflage, Tatsachen und Begrundung (2005).
Aufzüge and Fahrtreppen, Bibliothek der Technik, pp. 16-19, 24-29, 44, and 45, vol. 66 (1992).
Lueger Lexikon Der Technik, vol. 1, 1960, pp. 77-79.
Lueger Lexikon Der Technik, vol. 15, 1971, pp. 111-113.
DIN 15 306, pp. 1-6 (1977).
DIN 15 309, pp. 1-8 (1980).
DIN EN 10264-2, pp. 174-183 (2002).

(56) References Cited

OTHER PUBLICATIONS

DIN EN 10264-4, pp. 200-209 (2002).
"Elevator ropes: Selection to suit the type of installation", M. Molkow, Lift Report (1995).
"International standards for lift ropes", M. Molkow, Elevatori (2001).
"Updated Status of the International Standardization of Elevator Ropes", M. Molkow, Elevator World (2002).
"Achievements in wire rope production", Z. Kawecki et al., Wire Industry (1981).
European Norm EN-81-1, pp. 42-44, 54, 61, and 202 (1998).
Safety Code for Elevators and Escalators, ASME A17.1-2004, pp. 54-57 (2004).
Safety Rules for the construction and installation of lifts, Part 1:. Electric lifts, pp. 2-7 (1998).
ISO 4101, Drawn steel wire for elevator ropes—Specifications (1983).
ISO 4344, First Edition, pp. 1-4 (1983), Steel wire ropes for lifts.
"A Unified Fatigue and Fracture Model applied to Steel Wire Ropes", M. Weiss et al., Proceedings of the 16th European Conference of Fracture (2006).
UNE 36-715-89, Steel wire ropes for lifts (1989).
Lift Modernisation Design Guide, Roger Howkins (1998).

\* cited by examiner

ELEVATOR WITH HOISTING AND GOVERNOR ROPES

This application is a continuation application under 37 C.F.R. §1.53(b) of PCT International Application No. PCT/FI02/00500 filed on Jun. 7, 2002, which claims the benefit under 35 U.S.C. §119(a) of Finnish Patent Application 20011339 filed Jun. 21, 2001, the entire contents of each of which are hereby incorporated by reference.

Example embodiments relate to an elevator, more specifically, an elevator without a machine room.

BACKGROUND

One of the objectives in elevator development work is to achieve an efficient and economical utilization of building space. In recent years, this development work has produced various elevator solutions without machine room, among other things. Good examples of elevators without machine room are disclosed in specifications EP0 631 967 (A1) and EP0 631 968. The elevators described in these specifications are fairly efficient in respect of space utilization as they have made it possible to eliminate the space required by the elevator machine room in the building without a need to enlarge the elevator shaft. In the elevators disclosed in these specifications, the machine is compact at least in one direction, but in other directions it may have much larger dimensions than a conventional elevator machine.

In these basically good elevator solutions, the space required by the hoisting machine limits the freedom of choice in elevator lay-out solutions. Some space is needed to provide for the passage of the hoisting ropes. It is difficult to reduce the space required by the elevator car itself on its track and likewise the space required by the counterweight, at least at a reasonable cost and without impairing elevator performance and operational quality. In a traction sheave elevator without machine room, mounting the hoisting machine in the elevator shaft is difficult, especially in a solution with machine above, because the hoisting machine is a sizeable body of considerable weight. Especially in the case of larger loads, speeds and/or hoisting heights, the size and weight of the machine are a problem regarding installation, even so much so that the required machine size and weight have in practice limited the sphere of application of the concept of elevator without machine room or at least retarded the introduction of said concept in larger elevators.

Specification WO 99/43589 discloses an elevator suspended using flat belts in which relatively small diversion diameters on the traction sheave and diverting pulleys are achieved. However, the problem with this solution is the limitations regarding lay-out solutions, the disposition of components in the elevator shaft and the alignment of diverting pulleys. Also, the alignment of polyurethane-coated belts having a load-bearing steel component inside is problematic e.g. in a situation where the car is tilted. To avoid undesirable vibrations, an elevator so implemented needs to be rather robustly constructed at least as regards the machine and/or the structures supporting it. The massive construction of other parts of the elevator needed to maintain alignment between the traction sheave and diverting pulleys also increases the weight and cost of the elevator. In addition, installing and adjusting such a system is a difficult task requiring great precision.

On the other hand, to achieve a small rope diversion diameter, rope structures have been used in which the load-bearing part is made of artificial fiber. Such a solution is exotic and the ropes thus achieved are lighter than steel wire ropes, but at least in the case of elevators designed for the commonest hoisting heights, artificial-fiber ropes do not provide any substantial advantage, particularly because they are remarkably expensive as compared with steel wire ropes.

SUMMARY

The object of the invention is to achieve at least one of the following aims. On the one hand, it is an aim the invention to develop the elevator without machine room further so as to allow more effective space utilization in the building and elevator shaft than before. This means that the elevator must be so constructed that it can be installed in a fairly narrow elevator shaft if necessary. On the other hand, it is an aim of the invention to reduce the size and/or weight of the elevator or at least of the elevator machine.

The object of the invention should be achieved without impairing the possibility of varying the basic elevator layout.

An example embodiment of the elevator is described below. Other example embodiments of the elevator are also described below.

By applying the invention, one or more of the following advantages, among others, can be achieved:

A small traction sheave makes it possible to achieve a compact elevator and elevator machine.

By using a small coated traction sheave, the weight of the machine can easily be reduced even to about half or less of the weight of the machines now generally used in elevators without machine room. For example, in the case of elevators designed for a nominal load below 1000 kg, this means machines weighing 100-150 kg or even less. Via appropriate motor solutions and choices of materials, it is even possible to achieve machines weighing less than 100 kg. As would be understood by a person having ordinary skill in the art ("PHOSITA"), the recitation "nominal load" is synonymous with the recitation "maximum working load." Additionally, a PHOSITA would understand the recitations "working load" as referring to a load carrying capacity of the elevator car (including the weight of passengers and/or freight, but not the elevator car itself), and "maximum working load" as referring to a single value representing the maximum load carrying capacity of the elevator car (including the weight of passengers and/or freight, but not the elevator car itself).

A good traction sheave grip and light-weight components allow the weight of the elevator car to be considerably reduced, and correspondingly the counterweight can also be made lighter than in current elevator solutions.

A compact machine size and thin, substantially round ropes permit the elevator machine to be relatively freely placed in the shaft. Thus, the elevator solution can be implemented in a fairly wide variety of ways in the case of both elevators with machine above and elevators with machine below.

The elevator machine can be advantageously placed between the car and a shaft wall.

All or at least part of the weight of the elevator car and counterweight can be carried by the elevator guide rails.

In elevators applying the invention, an arrangement of centric suspension of the elevator car and counterweight can readily be achieved, thereby reducing the lateral supporting forces applied to the guide rails.

Applying the invention allows effective utilization of the cross-sectional area of the shaft.

The invention reduces the installation time and total installation costs of the elevator.

The elevator is economical to manufacture and install because many of its components are smaller and lighter than those used before.

The speed governor rope and the hoisting rope are usually different in respect of their properties and they can be easily distinguished from each other during installation if the speed governor rope is thicker than the hoisting ropes; on the other hand, the speed governor rope and the hoisting ropes may also be of identical structure, which will reduce ambiguities regarding these matters in elevator delivery logistics and installation.

The light, thin ropes are easy to handle, allowing considerably faster installation.

E.g. in elevators for a nominal load below 1000 kg and a speed below 2 m/s, the thin and strong steel wire ropes of the invention have a diameter of the order of only 3-5 mm.

With rope diameters of about 6 mm or 8 mm, fairly large and fast elevators according to the invention can be achieved.

The traction sheave and the rope pulleys are small and light as compared with those used in conventional elevators.

The small traction sheave allows the use of smaller operating brakes.

The small traction sheave reduces the torque requirement, thus allowing the use of a smaller motor with smaller operating brakes.

Because of the smaller traction sheave, a higher rotational speed is needed to achieve a given car speed, which means that the same motor output power can be reached by a smaller motor.

Either coated or uncoated ropes can be used.

It is possible to implement the traction sheave and the rope pulleys in such a way that, after the coating on the pulley has been worn out, the rope will bite firmly on the pulley and thus a sufficient grip between rope and pulley in this emergency is maintained.

The use of a small traction sheave makes it possible to use a smaller elevator drive motor, which means reduced drive motor acquisition/manufacturing costs.

The invention can be applied in gearless and geared elevator motor solutions.

Although the invention is primarily intended for use in elevators without machine room, it can also be applied in elevators with machine room.

The primary area of application of the invention is elevators designed for transporting people and/or freight. The invention is primarily intended for use in elevators whose speed range, in the case of passenger elevators, is normally about or above 1.0 m/s but may also be e.g. only about 0.5 m/s. In the case of freight elevators, too, the speed is preferably about 0.5 m/s, though slower speeds can also be used with large loads.

In both passenger and freight elevators, many of the advantages achieved through the invention are pronouncedly brought out even in elevators for only 3-4 people, and distinctly already in elevators for 6-8 people (500-630 kg).

The elevator of the invention can be provided with elevator hoisting ropes twisted e.g. from round and strong wires. From round wires, the rope can be twisted in many ways using wires of different or equal thickness. In ropes applicable with the invention, the wire thickness is below 0.4 mm on an average. Well applicable ropes made from strong wires are those in which the average wire thickness is below 0.3 mm or even below 0.2 mm. For instance, thin-wired and strong 4 mm ropes can be twisted relatively economically from wires such that the mean wire thickness in the finished rope is in the range of 0.15 . . . 0.23 mm, in which case the thinnest wires may have a thickness as small as only about 0.1 mm. Thin rope wires can easily be made very strong. The invention employs rope wires having a strength of about 2000 N/mm² or more. A suitable range of rope wire strength is 2300-2700 N/mm². In principle, it is possible to use rope wires as strong as about 3000 N/mm² or even more.

BRIEF DESCRIPTION OF THE DRAWINGS

In the following, the invention will be described in detail by the aid of a few examples of its embodiments with reference to the attached drawings, wherein.

DETAILED DESCRIPTIOIN OF EXAMPLE EMBODIMENTS

Figure 1:
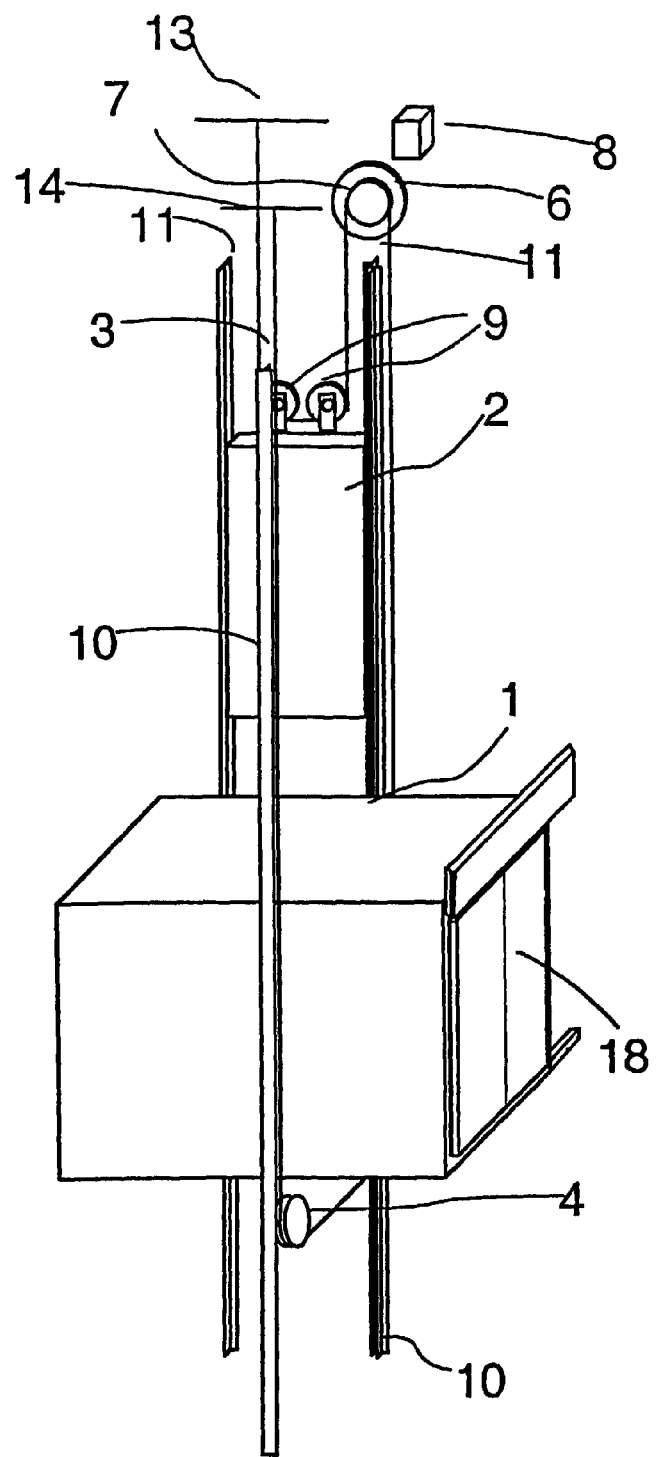
FIG. 1 presents a diagram representing a traction sheave elevator according to the invention.

FIG. 1 is a diagrammatic representation of the structure of an elevator. The elevator is preferably an elevator without machine room, in which the drive machine 6 is placed in the elevator shaft. The elevator shown in the figure is a traction sheave elevator with machine above. The passage of the hoisting ropes 3 of the elevator is as follows: One end of the ropes is immovably fixed to an anchorage 13 located in the upper part of the shaft above the path of a counterweight 2 moving along counterweight guide rails 11. From the anchorage, the ropes run downward and are passed around diverting pulleys 9 suspending the counterweight, which diverting pulleys 9 are rotatably mounted on the counterweight 2 and from which the ropes 3 run further upward to the traction sheave 7 of the drive machine 6, passing around the traction sheave along rope grooves on the sheave. From the traction sheave 7, the ropes 3 run further downward to the elevator car 1 moving along car guide rails 10, passing under the car via diverting pulleys 4 used to suspend the elevator car on the ropes, and going then upward again from the elevator car to an anchorage 14 in the upper part of the elevator shaft, to which anchorage the second end of the ropes 3 is fixed. Anchorage 13 in the upper part of the shaft, the traction sheave 7 and the diverting pulley 9 suspending the counterweight on the ropes are preferably so disposed in relation to each other that both the rope portion going from the anchorage 13 to the counterweight 2 and the rope portion going from the counterweight 2 to the traction sheave 7 are substantially parallel to the path of the counterweight 2. Similarly, a solution is preferred in which anchorage 14 in the upper part of the shaft, the traction sheave 7 and the diverting pulleys 4 suspending the elevator car on the ropes are so disposed in relation to each other that the rope portion going from the anchorage 14 to the elevator car 1 and the rope portion going from the elevator car 1 to the traction sheave 7 are substantially parallel to the path of the elevator car 1. With this arrangement, no additional diverting pulleys are needed to define the passage of the ropes in the shaft. The rope suspension acts in a substantially centric manner on the elevator car 1, provided that the rope pulleys 4 supporting the elevator car are mounted substantially symmetrically relative to the vertical center line passing via the center of gravity of the elevator car 1.

Figure 8:
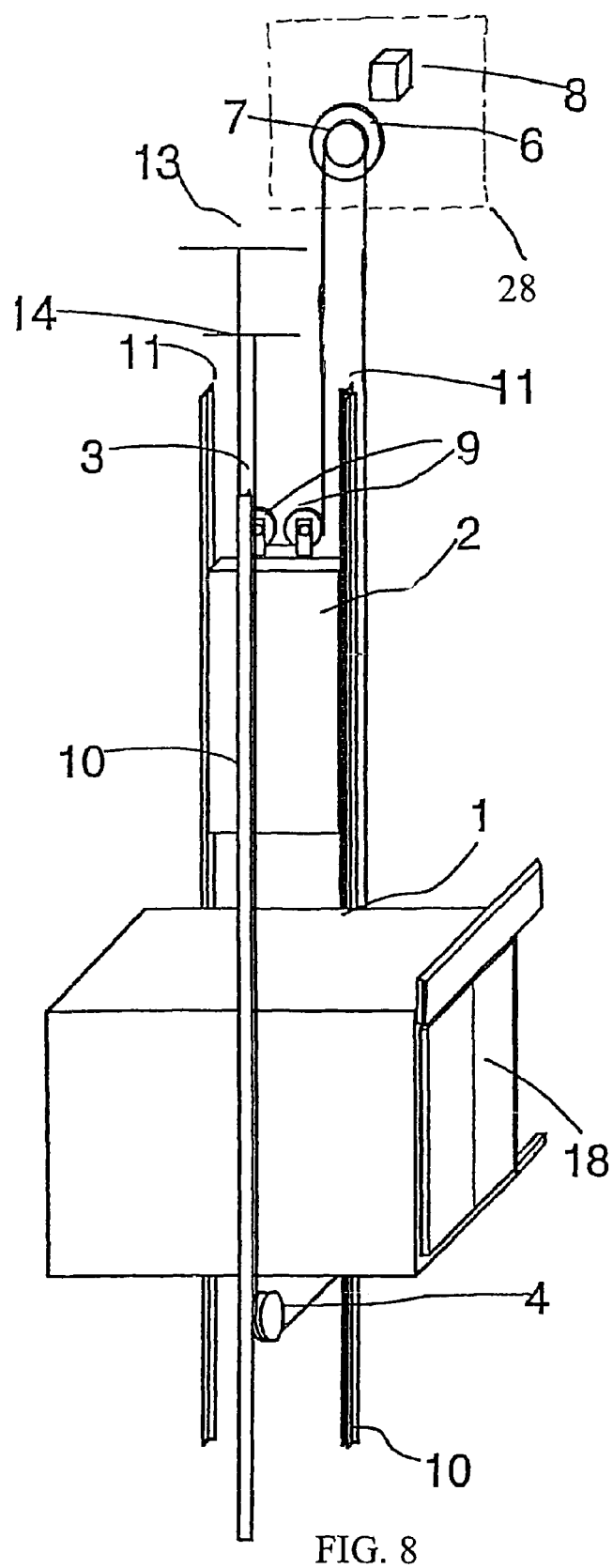
FIG. 8 presents a diagram representing a traction sheave elevator having a machine room according to the invention.

The elevator also may have a machine room, for example, machine room 28, as shown in FIG. 8. In this case, the drive machine 6, traction sheave 7, and/or the common instrument panel 8 may be located, for example, in machine room 28.

The drive machine 6 placed in the elevator shaft is preferably of a flat construction, in other words, the machine has a small depth as compared with its width and/or height, or at least the machine is slim enough to be accommodated between the elevator car and a wall of the elevator shaft. The machine may also be placed differently, e.g. by disposing the slim machine partly or completely between an assumed extension of the elevator car and a shaft wall. The elevator shaft can be provided with equipment required for the supply of power to the motor driving the traction sheave 7 as well as equipment for elevator control, both of which can be placed in a common instrument panel 8 or mounted separately from each other or integrated partly or wholly with the drive machine 6. The drive machine may be of a geared or gearless type. A preferable solution is a gearless machine comprising a permanent magnet motor. The drive machine may be fixed to a wall of the elevator shaft, to the ceiling, to a guide rail or guide rails or to some other structure, such as a beam or frame. In the case of an elevator with machine below, a further possibility is to mount the machine on the bottom of the elevator shaft. FIG. 1 illustrates the economical 2:1 suspension, but the invention can also be implemented in an elevator using a 1:1 suspension ratio, in other words, in an elevator in which the hoisting ropes are connected directly to the, counterweight and elevator car without diverting pulleys. Other suspension arrangements are also possible in an implementation of the invention. The elevator presented in the figure has automatic telescoping doors 18, but other types of automatic doors or turning doors can also be used in the elevator of the invention.

Figure 2:
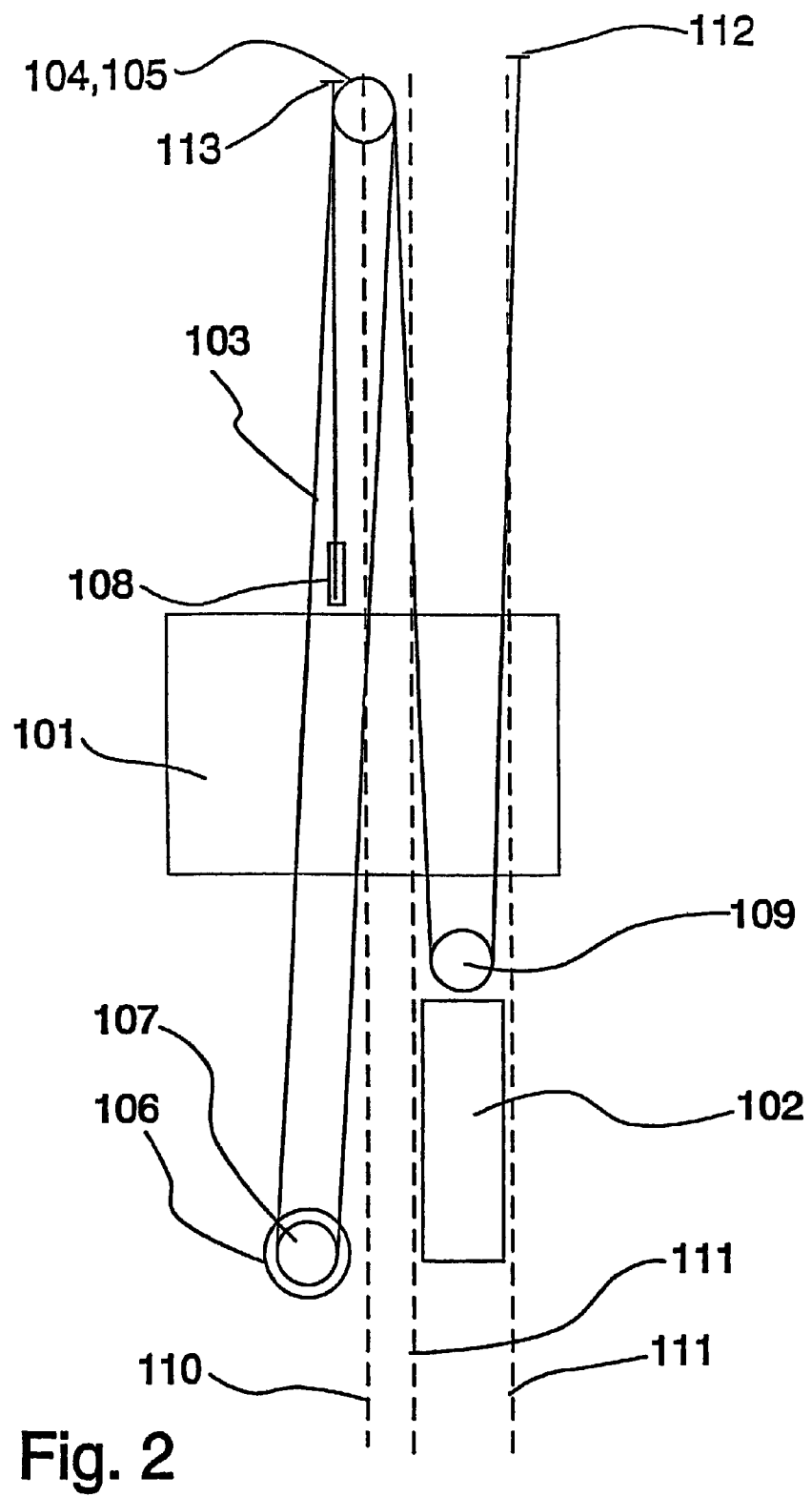
FIG. 2 presents a diagram representing another traction sheave elevator according to the invention.

FIG. 2 presents a diagram representing another traction sheave elevator according to the invention. In this elevator, the ropes go upward from the machine. This type of elevator is generally a traction sheave elevator with machine below. The elevator car 101 and the counterweight 102 are suspended on the hoisting ropes 103 of the elevator. The elevator drive machine 106 is mounted in the elevator shaft, preferably in the lower part of the shaft, and the hoisting ropes are passed via diverting pulleys 104,105 provided in the upper part of the elevator shaft to the car 101 and to the counterweight 102. The diverting pulleys 104,105 are placed in the upper part of the shaft and preferably separately mounted with bearings on the same axle so that they can rotate independently of each other. The hoisting ropes 103 consist of at least three parallel ropes.

The elevator car 101 and the counterweight 102 move in the elevator shaft along elevator and counterweight guide rails 110,111 guiding them.

In FIG. 2, the hoisting ropes run as follows: One end of the ropes is fixed to an anchorage 112 in the upper part of the shaft, from where it goes downward to the counterweight 102. The counterweight is suspended on the ropes 103 via a diverting pulley 109. From the counterweight, the ropes go further upward to a first diverting pulley 105 mounted on an elevator guide rail 110, and from the diverting pulley 105 further to the traction sheave 107 driven by the drive machine 106. From the traction sheave, the ropes go again upward to: a second diverting pulley 104, passing around it, after which they pass via diverting pulleys 108 mounted on top of the elevator car and then go further to an anchorage 113 in the upper part of the elevator shaft, where the other end of the hoisting ropes is fixed. The elevator car is suspended on the hoisting ropes 103 by means of diverting pulleys 108. In the hoisting ropes 103, one or more of the rope portions between the diverting pulleys or between the diverting pulleys and the traction sheave may deviate from an exact vertical direction, a circumstance that makes it easy to provide a sufficient distance between different rope portions or a sufficient distance between the hoisting ropes and other elevator components. The traction sheave 107 and the hoisting machine 106 are preferably disposed somewhat aside from the path of the elevator car 101 as well as that of the counterweight 102, so they can easily be placed almost at any height in the elevator shaft below the diverting pulleys 104 and 105. If the machine is not placed directly above or below the counterweight or elevator car, this will allow a saving in shaft height. In this case, the minimum height of the elevator shaft is exclusively determined on the basis of the length of the paths of the counterweight and elevator car and the safety clearances needed above and below these. In addition, a smaller space at the top or bottom of the shaft will be sufficient due to the reduced rope pulley diameters as compared with earlier solutions, depending on how the rope pulleys are mounted on the elevator car and/or on the frame of the elevator car. Sometimes it may be advantageous to make all or some of the diverting pulleys larger than the traction sheave. Among these larger diverting pulleys may be especially those mounted in the upper part of the shaft. For example, in the case of 4:1 suspension, a more spacious rope passage arrangement will be achieved by using somewhat larger diverting pulleys in the upper part of the shaft. Of course, this also applies to elevators with machine above, not only to elevators with machine below.

Figure 7:
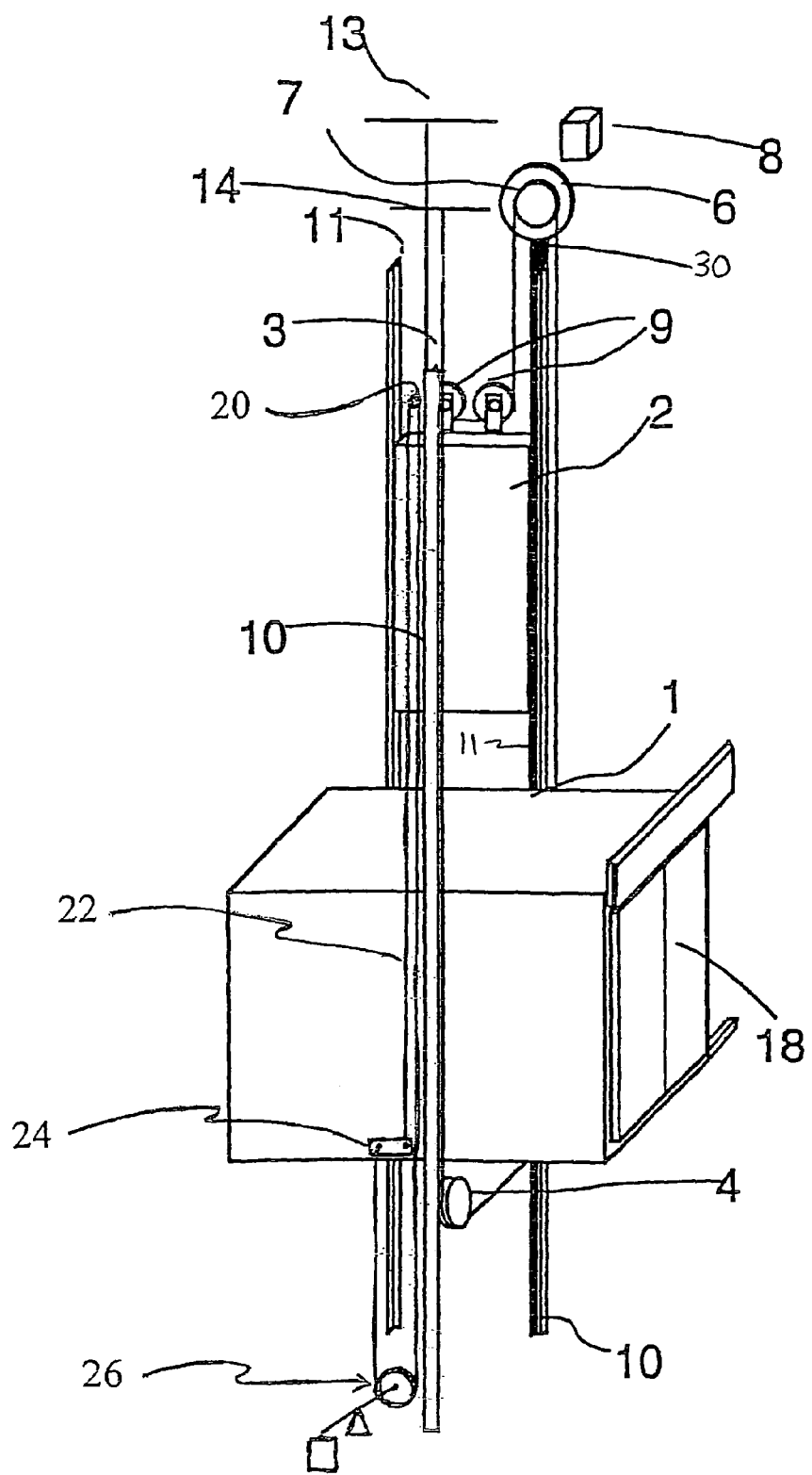
FIG. 7 presents a diagram representing a traction sheave elevator with a speed governor (and associated speed governor rope) according to the invention.

The elevator may include speed governor 20, speed governor rope 22, speed governor rope termination 24, and/or tensioning pulley 26, as shown, for example, in FIG. 7. The elevator also may include supporting element 30 supporting hoisting machine 6 on one of elevator car guide rails 10 or one of counterweight guide rails 11.

Figure 3:
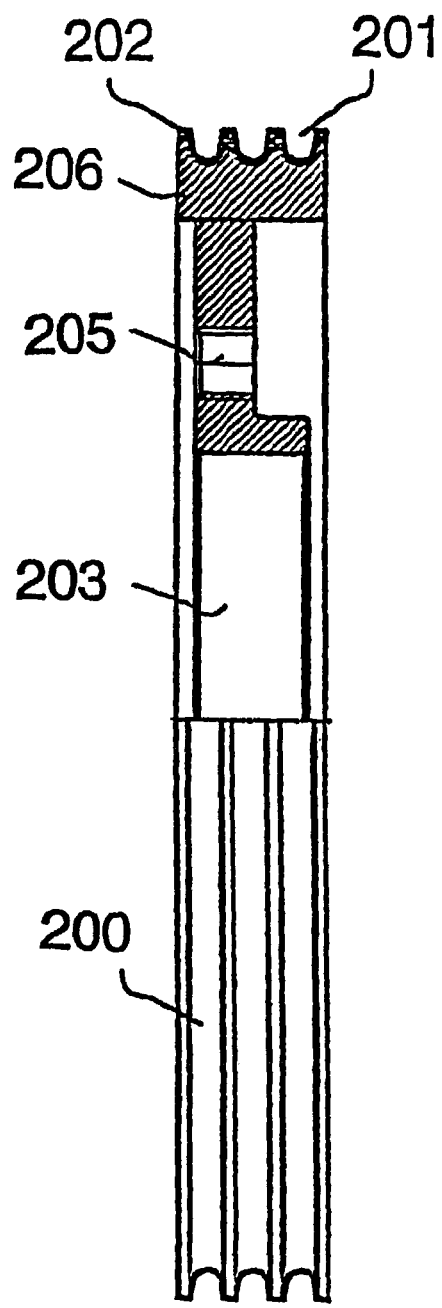
FIG. 3 presents a traction sheave applying the invention.

FIG. 3 presents a partially sectioned view of a rope pulley 200 applying the invention. The rope grooves 201 on the rim 206 of the rope pulley are covered by a coating 202. Provided in the hub of the rope pulley is a space 203 for a bearing used to mount the rope pulley. The rope pulley is also provided with holes 205 for bolts, allowing the rope pulley to be fastened by its side to an anchorage in the hoisting machine 6, e.g. to a rotating flange, to form a traction sheave 7, in which case no bearing separate from the hoisting machine is needed. The coating material used on the traction sheave and the rope pulleys may consist of rubber, polyurethane or a corresponding elastic material increasing friction. The material of the traction sheave and/or rope pulleys may also be so chosen that, together with the hoisting rope used, it forms a material pair such that the hoisting rope will bite firmly on the pulley after the coating on the pulley has been worn out. This ensures a sufficient grip between the rope pulley 200 and the hoisting rope 3 in an emergency where the coating 202 has been worn out from the rope pulley 200. This feature allows the elevator to maintain its functionality and operational reliability in the situation referred to. The traction sheave and/or the rope pulleys can also be manufactured in such manner that only the rim 206 of the rope pulley 200 is made of a material forming a grip increasing material pair with the hoisting rope 3. The use of strong hoisting ropes that are considerably thinner than normally allows the traction sheave and the rope pulleys to be designed to considerably smaller dimensions and sizes than when normal-sized ropes are used. This also makes it possible to use a motor of a smaller size with a lower torque as the drive motor of the elevator, which leads to a reduction of the acquisition cost of the motor. For example, in an elevator according to the invention designed for a nominal load below 1000 kg, the traction sheave diameter is preferably 120-200 mm, but it may even be less than this. The traction sheave diameter depends on the thickness of the hoisting ropes used. In the elevator of the invention, the use of a small traction sheave, e.g. in the case of elevators for a nominal load below 1000 kg, makes it possible to achieve a machine weight even as low as about one half of the weight of currently used machines, which means producing elevator machines weighing 100-150 kg or even less. In the invention, the machine is understood as comprising at least the traction sheave, the motor, the machine housing structures and the brakes. The diameter of the traction sheave depends on the thickness of the hoisting ropes used. The diameter ratio conventionally used is D/d=40 or higher, where D=traction sheave diameter and d=hoisting rope thickness. At the expense of wear resistance of the ropes, this ratio could be somewhat reduced. Alternatively, without compromising on service life, the D/d ratio can be reduced if the number of ropes is increased at the same time, in which case the stress for each rope is smaller. Such a D/d ratio below 40 could be e.g. a D/d ratio equal to about 30 or even less, e.g. D/d=25. However, reducing the D/d ratio considerably below 30 often radically reduces the service life of the rope, although this can be compensated for by using ropes of special construction. In practice it is very difficult to achieve a D/d ratio below 20, but it might be accomplished by using a rope specifically designed for this purpose, although such a rope would most probably be expensive.

The weight of the elevator machine and its supporting elements used to hold the machine in place in the elevator shaft is at most about ⅕ of the nominal load. If the machine is exclusively or almost exclusively supported by one or more elevator and/or counterweight guide rails, then the total weight of the machine and its supporting elements may be less than about ⅙ or even less than ⅛ of the nominal load. Nominal load of an elevator means a load defined for elevators of a given size. The supporting elements of the elevator machine may include e.g. a beam, carriage or suspension bracket used to support or suspend the machine on/from a wall structure or ceiling of the elevator shaft or on the elevator or counterweight guide rails, or clamps used to hold the machine fastened to the sides of the elevator guide rails. It will be easy to achieve an elevator in which the machine deadweight without supporting elements is below ⅐ of the nominal load or even about 1/10 of the nominal load or still less. Basically, the ratio of machine weight to nominal load is given for a conventional elevator in which the counterweight has a weight substantially equal to the weight of an empty car plus half the nominal load. As an example of machine weight in an elevator of a given nominal weight when the fairly common 2:1 suspension ratio is used with a nominal load of 630 kg, the combined weight of the machine and its supporting elements may be only 75 kg when the traction sheave diameter is 160 mm and hoisting ropes having a diameter of 4 mm are used, in other words, the total weight of the machine and its supporting elements is about ⅛ of the nominal load of the elevator. As another example, using the same 2:1 suspension ratio, the same 160 mm traction sheave diameter and the same 4 mm hoisting rope diameter, in an elevator for a nominal load of about 1000 kg, the total weight of the machine and its supporting elements is about 150 kg, so in this case the machine and its supporting elements have a total weight equaling about ⅙ of the nominal load. As a third example, let us consider an elevator designed for a nominal load of 1600 kg. In this case, when the suspension ratio is 2:1, the traction sheave diameter 240 mm and the hoisting rope diameter 6 mm, the total weight of the machine and its supporting elements will be about 300 kg, i.e. about ⅐ of the nominal load. By varying the hoisting rope suspension arrangements, it is possible to reach a still lower total weight of the machine and its supporting elements. For example, when a 4:1 suspension ratio, a 160 mm traction sheave diameter and a 4 mm hoisting rope diameter are used in an elevator designed for a nominal load of 500 kg, a total weight of machine and its supporting elements of about 50 kg will be achieved. In this case, the total weight of the machine and its supporting elements is as small as only about 1/10 of the nominal load. When the traction sheave size is substantially reduced and a higher suspension ratio introduced, the motor torque output requirement falls to a fraction of the level required in the starting situation. For example, if a 4:1 suspension ratio is used instead of 2:1 suspension and if a traction sheave having a diameter of 160 mm is used instead of one with a diameter of 400 mm, then, if the increased losses are ignored, the torque requirement falls to one fifth. Thus, the size of the machine is also really substantially reduced.

Figure 4:
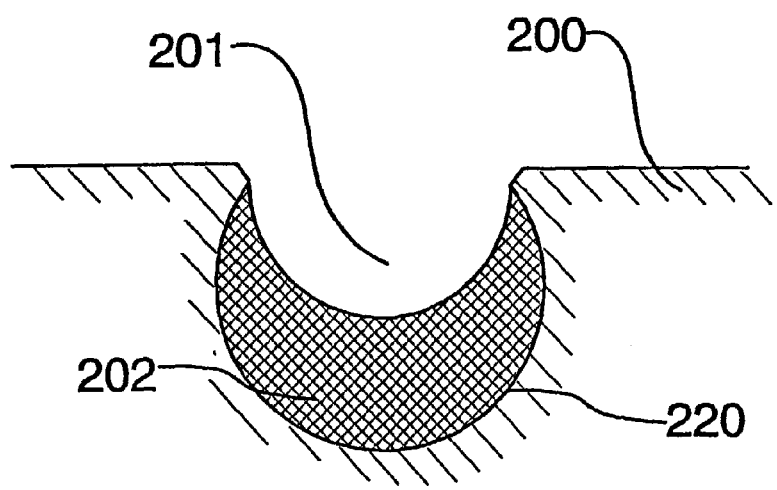
FIG. 4 presents a coating solution according to the invention.

FIG. 4 presents a solution in which the rope groove 201 is in a coating 202 which is thinner at the sides of the rope groove 201 than at the bottom. In such a solution, the coating 202 is placed in a basic groove 220 provided in the rope pulley 200 so that deformations produced in the coating 202 by the pressure imposed on it by the rope will be small and mainly limited to the rope surface texture sinking into the coating. Such a solution often means in practice that the rope pulley coating 202 consists of rope groove-specific sub-coatings separate from each other, but considering manufacturing or other aspects it may be appropriate to design the rope pulley coating 202 so that it extends continuously over a number of grooves.

By making the coating 202 thinner at the sides of the groove than at its bottom, the strain imposed by the rope on the bottom of the rope groove while sinking into the groove is avoided or at least reduced. As the pressure cannot be discharged laterally but is directed by the combined effect of the shape of the basic groove 220 and the thickness variation of the coating 202 to support the rope in the rope groove 201, lower maximum surface pressures acting on the rope and the coating are also achieved. One method of making a grooved coating 202 like this is to fill the round-bottomed basic groove 220 with coating material and then form a half-round rope groove 201 in this coating material in the basic groove 220. The shape of the rope grooves 201 is well supported and the load-bearing surface layer under the rope provides a better resistance against lateral propagation of the compression stress produced by the ropes. The lateral spreading or rather adjustment of the coating caused by the pressure is promoted by thickness and elasticity of the coating and reduced by hardness and eventual reinforcements of the coating. The coating thickness on the bottom of the rope groove can be made large, even as large as half the rope thickness, in which case a hard and inelastic coating is needed. On the other hand, if a coating thickness corresponding to only about one tenth of the rope thickness is used, then the coating material may be clearly softer. An elevator for eight persons could be implemented using a coating thickness at the bottom of the groove equal to about one fifth of the rope thickness if the ropes and the rope load are chosen appropriately. The coating thickness should equal at least 2-3 times the depth of the rope surface texture formed by the surface wires of the rope. Such a very thin coating, having a thickness even less than the thickness of the surface wire of the rope, will not necessarily endure the strain imposed on it. In practice, the coating must have a thickness larger than this minimum thickness because the coating will also have to receive rope surface variations rougher than the surface texture. Such a rougher area is formed e.g. where the level differences between rope strands are larger than those between wires. In practice, a suitable minimum coating thickness is about 1-3 times the surface wire thickness. In the case of the ropes normally used in elevators, which have been designed for a contact with a metallic rope groove and which have a thickness of 810 mm, this thickness definition leads to a coating at least about 1 mm thick. Since a coating on the traction sheave, which causes more rope wear than the other rope pulleys of the elevator, will reduce rope wear and therefore also the need to provide the rope with thick surface wires, the rope can be made smoother. Rope smoothness can naturally be improved by coating the rope with a material suited for this purpose, such as e.g. polyurethane or equivalent. The use of thin wires allows the rope itself to be made thinner, because thin steel wires can be manufactured from a stronger material than thicker wires. For instance, using 0.2 mm wires, a 4 mm thick elevator hoisting rope of a fairly good construction can be produced. Depending on the thickness of the hoisting rope used and/or on other reasons, the wires in the steel wire rope may preferably have a thickness between 0.15 mm and 0.5 mm, in which range there are readily available steel wires with good strength properties in which even an individual wire has a sufficient wear resistance and a sufficiently low susceptibility to damage. In the above, ropes made of round steel wires have been discussed. Applying the same principles, the ropes can be wholly or partly twisted from non-round profiled wires. In this case, the cross-sectional areas of the wires are preferably substantially the same as for round wires, i.e. in the range of $0.015$ $mm^2$ -$0.2$ $mm^2$. Using wires in this thickness range, it will be easy to produce steel wire ropes having a wire strength above about 2000 N/$mm^2$ and a wire cross-section of $0.015$ $mm^2$- $0.2$ $mm^2$ and comprising a large cross-sectional area of steel material in relation to the cross-sectional area of the rope, as is achieved e.g. by using the Warrington construction. For the implementation of the invention, particularly well suited are ropes having a wire strength in the range of 2300 N/$mm^2$ -2700 N/$mm^2$, because such ropes have a very large bearing capacity in relation to rope thickness while the high hardness of the strong wires involves no substantial difficulties in the use of the rope in elevators. A traction sheave coating well suited for such a rope is already clearly below 1 mm thick. However, the coating should be thick enough to ensure that it will not be very easily scratched away or pierced e.g. by an occasional sand grain or similar particle having got between the rope groove and the hoisting rope. Thus, a desirable minimum coating thickness, even when thin-wire hoisting ropes are used, would be about 0.5 . . . 1 mm. For hoisting ropes having small surface wires and an otherwise relatively smooth surface, a coating having a thickness of the form A+B cos a is well suited. However, such a coating is also applicable to ropes whose surface strands meet the rope groove at a distance from each other, because if the coating material is sufficiently hard, each strand meeting the rope groove is in a way separately supported and the supporting force is the same and/or as desired. In the formula A+B cos a, A and B are constants so that A+B is the coating thickness at the bottom of the rope groove 301 and the angle a is the angular distance from the bottom of the rope groove as measured from the center of curvature of the rope groove cross-section. Constant A is larger than or equal to zero, and constant B is always larger than zero. The thickness of the coating growing thinner towards the edges can also be defined in other ways besides using the formula A+B cos a so that the elasticity decreases towards the edges of the rope groove. The elasticity in the central part of the rope groove can also be increased by making an undercut rope groove and/or by adding to the coating on the bottom of the rope groove a portion of different material of special elasticity, where the elasticity has been increased, in addition to increasing the material thickness, by the use of a material that is softer than the rest of the coating.

Figure 5A:
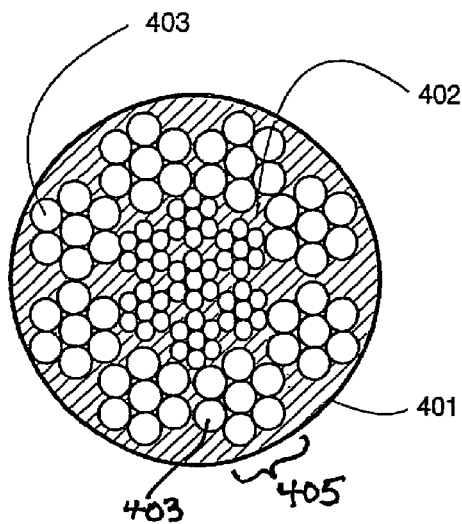
FIG. 5A presents a steel wire rope used in the invention.
Figure 5B:
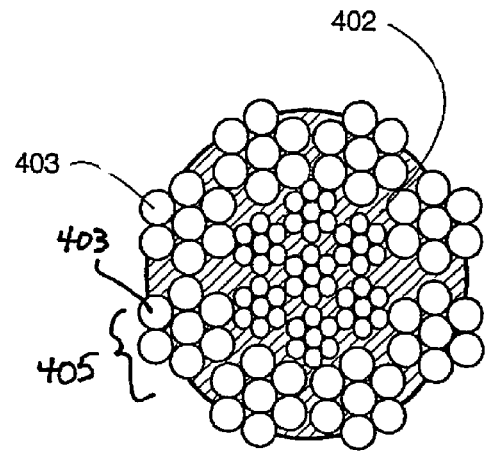
FIG. 5B presents another steel wire rope used in the invention.
Figure 5C:
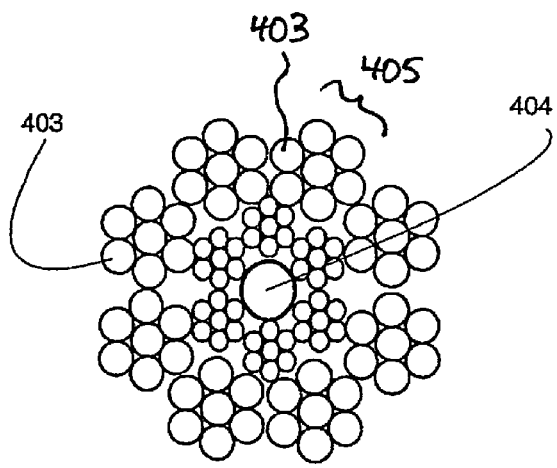
FIG. 5C presents a third steel wire rope used in the invention.

FIGS. 5A, 5B, and 5C present cross-sections of steel wire ropes used in the invention. The ropes in these figures contain thin steel wires 403, a coating 402 on the steel wires 403 and/or partly between the steel wires 403 and, in FIG. 5A, a coating 401 over the steel wires 403. The rope presented in FIG. 5B is an uncoated steel wire rope with a rubber-like filler added to its interior structure, and FIG. 5A presents a steel wire rope provided with a coating in addition to a filler added to the internal structure. The rope presented in FIG. 5C has a non-metallic core 404, which may be a solid or fibrous structure made of plastic, natural fiber, or some other material suited for the purpose. A fibrous structure will be good if the rope is lubricated, in which case lubricant will accumulate in the fibrous core. The core thus acts as a kind of lubricant storage. The steel wire ropes of substantially round cross-section used in the elevator of the invention may be coated, uncoated, and/or provided with a rubber-like filler, such as, e.g., polyurethane or some other suitable filler, added to the interior structure of the rope and acting as a kind of lubricant lubricating the rope and also balancing the pressure between wires 403 and strands 405. The use of a filler makes it possible to achieve a rope that needs no lubrication, so its surface can be dry. The coating used in the steel wire ropes may be made of the same or nearly the same material as the filler or of a material that is better suited for use as a coating and has properties, such as friction and wear resistance properties, that are better suited to the purpose than a filler. The coating of the steel wire rope may also be so implemented that the coating material penetrates partially into the rope or through the entire thickness of the rope, giving the rope the same properties as the filler mentioned above. The use of thin and strong steel wire ropes according to the invention is possible because the steel wires 403 used are wires of special strength, allowing the ropes to be made substantially thin as compared with steel wire ropes used before. The ropes presented in FIGS. 5A and 5B are steel wire ropes having a diameter of about 4 mm. For example, when a 2:1 suspension ratio is used, the thin and strong steel wire ropes of the invention preferably have a diameter of about 2.5 mm -5 mm in elevators for a nominal load below 1,000 kg, and preferably about 5 mm -8 mm in elevators for a nominal load above 1,000 kg. In principle, it is possible to use ropes thinner than this, but in this case a large number of ropes will be needed. Still, by increasing the suspension ratio, ropes thinner than those mentioned above can be used for corresponding loads, and at the same time a smaller and lighter elevator machine can be achieved.

Figure 9:
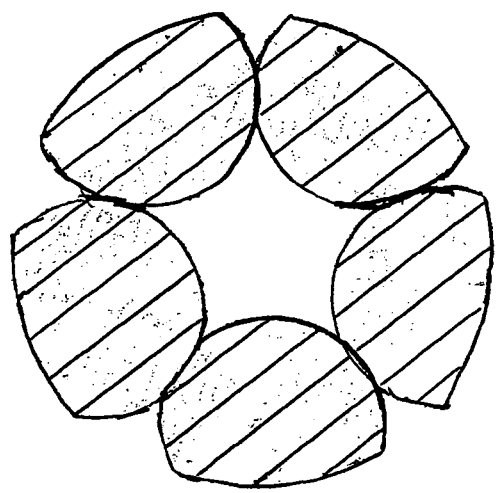
FIG. 9 presents an example embodiment of a steel wire rope that has a load-bearing part twisted from steel wires of non-circular cross-section.
Figure 10:
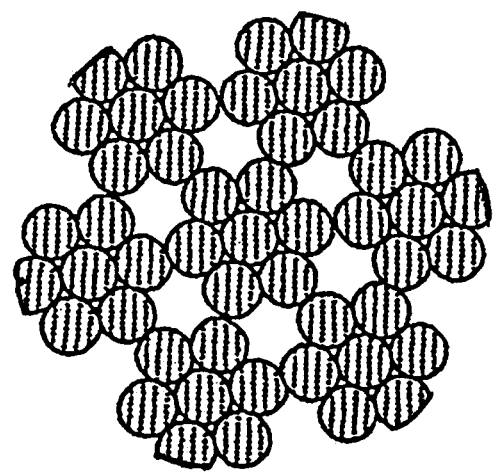
FIG. 10 presents an example embodiment of a steel wire rope that has a load-bearing part twisted from steel wires of circular and non-circular cross-section.

The hoisting ropes 3 may have, for example, a load-bearing part twisted from steel wires of circular cross-section (e.g., FIG. 5c), non-circular cross-section (e.g., FIG. 9), or circular and non-circular cross-section (e.g., FIG. 10).

Figure 6:
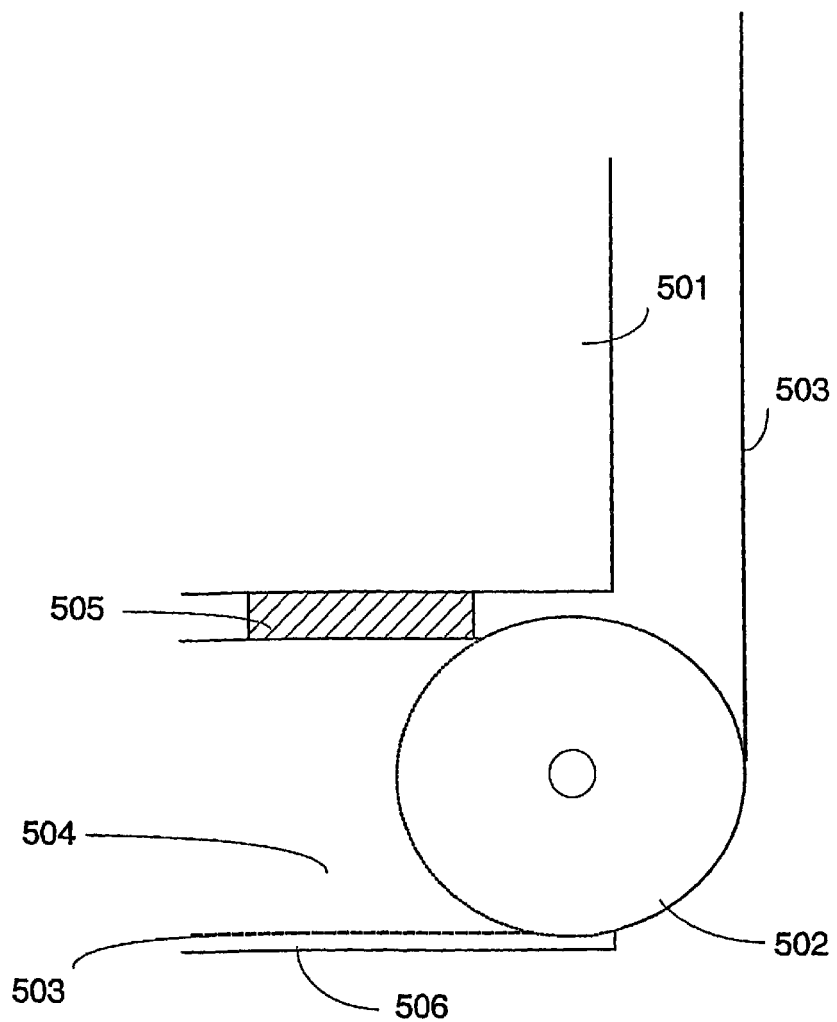
FIG. 6 presents a diagram illustrating a rope pulley lay-out according to the invention.

FIG. 6 illustrates the manner in which a rope pulley 502 connected to a horizontal beam 504 comprised in the structure supporting the elevator car 501 is placed in relation to the beam 504, said rope pulley being used to support the elevator car and associated structures. The rope pulley 502 presented in the figure may have a diameter equal to or less than the height of the beam 504 comprised in the structure. The beam 504 supporting the elevator car 501 may be located either below or above the elevator car. The rope pulley 502 may be placed completely or partially inside the beam 504, as shown in the figure. The hoisting ropes 503 of the elevator in the figure run as follows: The hoisting ropes 503 come to the coated rope pulley 502 connected to the beam 504 comprised in the structure supporting the elevator car 501, from which pulley the hoisting rope runs further, protected by the beam, e.g. in the hollow 506 inside the beam, under the elevator car and goes then further via a second rope pulley placed on the other side of the elevator car. The elevator car 501 rests on the beam 504 comprised in the structure, on vibration absorbers 505 placed between them. The beam 504 also acts as a rope guard for the hoisting rope 503. The beam 504 may be a C-, U-, I-, Z-section beam or a hollow beam or equivalent.

It is obvious to the person skilled in the art that different embodiments of the invention are not limited to the examples described above, but that they may be varied within the scope of the following claims. For instance, the number of times the hoisting ropes are passed between the upper part of the elevator shaft and the counterweight or elevator car is not a very decisive question as regards the basic advantages of the invention, although it is possible to achieve some additional advantages by using multiple rope passages. In general, embodiments should be so implemented that the ropes go to the elevator car at most as many times as to the counterweight. It is also obvious that the hoisting ropes need not necessarily be passed under the car. In accordance with the examples described above, a skilled person can vary the embodiment of the invention as the traction sheaves and rope pulleys, instead of being coated metal pulleys, may also be uncoated metal pulleys or uncoated pulleys made of some other material suited to the purpose.

It is further obvious to the person skilled in the art that the metallic traction sheaves and rope pulleys used in the invention, which are coated with a non-metallic material at least in the area of their grooves, may be implemented using a coating material consisting of e.g. rubber, polyurethane or some other material suited to the purpose.

It is also obvious to the person skilled in the art that the elevator car, the counterweight and the machine unit may be laid out in the cross-section of the elevator shaft in a manner differing from the lay-out described in the examples. Such a different lay-out might be e.g. one in which the machine and the counterweight are located behind the car as seen from the shaft door and the ropes are passed under the car diagonally relative to the bottom of the car. Passing the ropes under the car in a diagonal or otherwise oblique direction relative to the form of the bottom provides an advantage when the suspension of the car on the ropes is to be made symmetrical relative to the center of mass of the elevator in other types of suspension lay-out as well.

It is further obvious to the person skilled in the art that the equipment required for the supply of power to the motor and the equipment needed for elevator control can be placed elsewhere than in connection with the machine unit, e.g. in a separate instrument panel. It is likewise obvious to the skilled person that an elevator applying the invention may be equipped differently from the examples described above.

It is also obvious to the skilled person that, instead of using ropes with a filler as illustrated in FIGS. 5A and 5B, the invention may be implemented using ropes without filler, which are either lubricated or unlubricated. In addition, it is also obvious to the person skilled in the art that the ropes may be twisted in many different ways.

As average of the wire thicknesses, a statistical average or mean value—e.g. the geometrical or arithmetical mean value—of the thicknesses of all wires of a hoisting rope is understood. For statistical average or mean value, the standard deviation, Gauss distribution, medium error square or deviation square method etc. could be used. Often wires of the same thickness are used in a rope, in which case the average thickness describes the thickness of each wire of the rope. If wires of different thicknesses should be used, for the same reason the maximum wire thickness in the rope should preferably not exceed the factor 4, more preferably 3 or most preferably 2 of the average wire thickness.

The invention claimed is:

1. An elevator without a machine room, the elevator comprising:
a hoisting machine;
a set of hoisting ropes;
a traction sheave that comprises a plurality of grooves; and
diverting pulleys;
wherein the hoisting machine engages the set of hoisting ropes via the traction sheave,
wherein each of the hoisting ropes individually contacts one of the plurality of grooves,
wherein each of the hoisting ropes has a substantially round cross-section,
wherein the set of hoisting ropes comprises steel wires of circular, non-circular, or circular and non-circular cross-section, twisted together to form strands,
wherein the strands of each respective hoisting rope are twisted together to form the respective hoisting rope,
wherein a thickness of each of the hoisting ropes is greater than or equal to 2.5 mm and less than or equal to 8 mm,
wherein a cross-sectional area of the steel wires of the hoisting ropes is greater than 0.015 mm$^2$ and less than 0.2 mm$^2$, and
wherein the steel wires of the hoisting ropes have a strength greater than 2,700 N/mm$^2$ and less than 3,000 N/mm$^2$.

2. The elevator of claim 1, wherein an outer diameter of the traction sheave is at most about 250 mm.

3. The elevator of claim 1, further comprising:
a speed governor rope;
wherein the speed governor rope is thicker in diameter than the hoisting ropes.

4. The elevator of claim 1, further comprising:
a speed governor rope;
wherein the speed governor rope is of a same thickness in diameter as the hoisting ropes.

5. The elevator of claim 1, wherein at least part of a space between strands and wires in the hoisting ropes is filled with at least one of rubber, urethane, and some other medium of substantially non-fluid nature.

6. The elevator of claim 1, wherein the hoisting ropes have a surface made of at least one of rubber, urethane, and some other non-metallic material.

7. The elevator of claim 1, wherein the traction sheave is coated, at least in the plurality of grooves, with a non-metallic material.

8. The elevator of claim 1, wherein the traction sheave is made of a non-metallic material, at least in a rim part including the plurality of grooves.

9. The elevator of claim 1, wherein a ratio of a traction sheave diameter (D) to a hoisting rope thickness (d) is lower than 40:1.

10. The elevator of claim 1, wherein at least part of a space between strands or wires in the hoisting ropes is filled with at least one of rubber, urethane, and some other medium of substantially non-fluid nature.

11. The elevator of claim 1, wherein the cross-sectional area of the steel wires of the hoisting ropes is greater than 0.015 mm$^2$ and less than 0.2 mm$^2$.

12. An elevator with a machine room, the elevator comprising:
   a hoisting machine;
   a set of hoisting ropes;
   a traction sheave that comprises a plurality of grooves; and diverting pulleys;
   wherein the hoisting machine engages the set of hoisting ropes via the traction sheave,
   wherein each of the hoisting ropes individually contacts one of the plurality of grooves,
   wherein each of the hoisting ropes has a substantially round cross-section,
   wherein the set of hoisting ropes comprises steel wires of circular, non-circular, or circular and non-circular cross-section, twisted together to form strands,
   wherein the strands of each respective hoisting rope are twisted together to form the respective hoisting rope,
   wherein a thickness of each of the hoisting ropes is greater than or equal to 2.5 mm and less than or equal to 8 mm,
   wherein a cross-sectional area of the steel wires of the hoisting ropes is greater than 0.015 mm$^2$ and less than 0.2 mm$^2$, and
   wherein the steel wires of the hoisting ropes have a strength greater than 2,700 N/mm$^2$ and less than 3,000 N/mm$^2$.

13. The elevator of claim 12, wherein an outer diameter of the traction sheave is at most about 250 mm.

14. The elevator of claim 12, further comprising:
   a speed governor rope;
   wherein the speed governor rope is thicker in diameter than the hoisting ropes.

15. The elevator of claim 12, further comprising:
   a speed governor rope;
   wherein the speed governor rope is of a same thickness in diameter as the hoisting ropes.

16. The elevator of claim 12, wherein at least a part of a space between strands and wires in the hoisting ropes is filled with at least one of rubber, urethane, and some other medium of substantially non-fluid nature.

17. The elevator of claim 12, wherein the hoisting ropes have a surface made of at least one of rubber, urethane, and some other non-metallic material.

18. The elevator of claim 12, wherein the traction sheave is coated, at least in the plurality of grooves, with a non-metallic material.

19. The elevator of claim 12, wherein the traction sheave is made of a non-metallic material, at least in a rim part including the plurality of grooves.

20. The elevator of claim 12, wherein a ratio of a traction sheave diameter (D) to a hoisting rope thickness (d) is lower than 40:1.

21. The elevator of claim 12, wherein at least a part of a space between strands or wires in the hoisting ropes is filled with at least one of rubber, urethane, and some other medium of substantially non-fluid nature.

22. The elevator of claim 12, wherein the cross-sectional area of the steel wires of the hoisting ropes is greater than 0.015 mm$^2$ and less than 0.2 mm$^2$.

* * * * *